(12) United States Patent
Bacco et al.

(10) Patent No.: US 9,296,009 B2
(45) Date of Patent: Mar. 29, 2016

(54) ADHESIVE DISPENSING SYSTEM HAVING METERING SYSTEM INCLUDING VARIABLE FREQUENCY DRIVE AND CLOSED-LOOP FEEDBACK CONTROL

(75) Inventors: David Robert Bacco, Canton, GA (US); David Mark Pendley, Buford, GA (US)

(73) Assignee: NORDSON CORPORATION, Westlake, OH (US)

( * ) Notice: Subject to any disclaimer, the term of this patent is extended or adjusted under 35 U.S.C. 154(b) by 174 days.

(21) Appl. No.: 13/548,543

(22) Filed: Jul. 13, 2012

(65) Prior Publication Data
US 2014/0014686 A1    Jan. 16, 2014

(51) Int. Cl.
  *B67D 7/14* (2010.01)
  *B05C 11/10* (2006.01)
  *B05C 5/00* (2006.01)
(52) U.S. Cl.
  CPC ......... *B05C 11/1013* (2013.01); *B05C 11/1044* (2013.01); *B05C 5/001* (2013.01); *B05C 11/1042* (2013.01); *Y02P 70/38* (2015.11)
(58) Field of Classification Search
  CPC ............ B05C 11/1013; B05C 11/1042; B05C 11/1044; B05C 5/001; F04D 15/00; F04D 15/0066; F04B 49/20; B05B 12/085; Y10T 156/1798
  USPC .......... 222/63, 71, 27, 28, 73, 255, 263, 333, 222/54, 146.2, 146.5; 427/8, 207.1; 118/683; 417/43, 42, 4; 700/282
  See application file for complete search history.

(56) References Cited

U.S. PATENT DOCUMENTS

| | | | | |
|---|---|---|---|---|
| 4,682,710 | A * | 7/1987 | Turner et al. | 222/63 |
| 4,795,314 | A * | 1/1989 | Prybella et al. | 417/43 |
| 4,821,922 | A * | 4/1989 | Miller et al. | 222/77 |
| 5,775,542 | A * | 7/1998 | Field | 222/146.5 |
| 6,423,366 | B2 * | 7/2002 | Falck et al. | 427/8 |
| 6,630,028 | B2 * | 10/2003 | Briese et al. | 118/683 |
| 6,836,616 | B2 * | 12/2004 | Jamison et al. | 392/471 |

(Continued)

FOREIGN PATENT DOCUMENTS

WO     0153389 A1     7/2001

OTHER PUBLICATIONS

Nordson Corporation, AltaBlue™ Adhesive Melters Models 15, 30, 50, and 100, Customer Product Manual, Dec. 2010, 254 pgs.

(Continued)

*Primary Examiner* — Frederick C Nicolas
*Assistant Examiner* — Bob Zadeh
(74) *Attorney, Agent, or Firm* — Baker & Hostetler LLP

(57) ABSTRACT

A hot melt adhesive dispensing unit includes an adhesive supply for receiving solid or semi-solid hot melt adhesive material, an adhesive supply heater associated with the adhesive supply for melting the solid or semi-solid hot melt adhesive material into a liquid hot melt adhesive material, a manifold connected to the adhesive supply and including a flow rate sensor for measuring a flow rate of the liquid hot melt adhesive material, the flow rate sensor generating flow rate information, a pump connected to the manifold for pumping liquid hot melt adhesive material from the adhesive supply into the manifold, the pump including a pump motor, and a variable frequency drive for controlling the pump motor. The variable frequency drive is in communication with the flow rate sensor for receiving the flow rate information and the pump motor for controlling the speed of the pump motor.

11 Claims, 3 Drawing Sheets

(56) References Cited

U.S. PATENT DOCUMENTS

| | | | |
|---|---|---|---|
| 6,857,441 B2 | 2/2005 | Flavelle | |
| 6,883,684 B2 * | 4/2005 | Jeter et al. | 222/146.2 |
| 7,429,299 B2 * | 9/2008 | McGlinchy et al. | 118/683 |
| 7,874,456 B2 * | 1/2011 | Bolyard et al. | 222/55 |
| 7,874,808 B2 * | 1/2011 | Stiles | 417/18 |
| 8,774,972 B2 * | 7/2014 | Rusnak et al. | 700/282 |
| 2001/0046551 A1 * | 11/2001 | Falck et al. | 427/8 |
| 2003/0127453 A1 | 7/2003 | Kichline | |
| 2003/0148018 A1 | 8/2003 | Hoffmann et al. | |
| 2005/0230423 A1 * | 10/2005 | Riney et al. | 222/146.2 |
| 2007/0114162 A1 * | 5/2007 | Stiles et al. | 210/137 |
| 2009/0200245 A1 * | 8/2009 | Steinbrueck et al. | 210/741 |
| 2009/0294470 A1 * | 12/2009 | Lampe | 222/1 |
| 2010/0038292 A1 * | 2/2010 | Fike | 210/87 |

OTHER PUBLICATIONS

Nordson Corporation, Selecting the Right Adhesive Melters for Your Packaging Application, Brochure, 2005, 4 pgs.

Nordson Corporation, Universal TruFlow Controller/Monitor, Customer Product Manual, Sep. 2009, 54 pgs.

European Patent Office, European Search Report in EP Application No. 13172311, Nov. 20, 2013.

Mexican Patent Office, first Office Action in MX Application No. MX/a/2013/008033, Nov. 23, 2015.

* cited by examiner

ADHESIVE DISPENSING SYSTEM HAVING METERING SYSTEM INCLUDING VARIABLE FREQUENCY DRIVE AND CLOSED-LOOP FEEDBACK CONTROL

FIELD OF THE INVENTION

The present invention generally relates to hot melt adhesive dispensing equipment, and more particularly to metering systems used with hot melt adhesive dispensing systems.

BACKGROUND

Hot melt adhesive systems have many applications in manufacturing and packaging. For example, thermoplastic hot melt adhesive materials are used for carton sealing, case sealing, tray forming, pallet stabilization, nonwoven applications including diaper manufacturing, and many other applications. Typically, hot melt adhesive materials are contained in or provided from an adhesive supply, such as a tank or hopper of an adhesive melter. The hot melt adhesive material is heated, melted, and pumped to a dispenser, such as a dispensing gun or other applicator which applies the hot melt adhesive material to a carton, case, or other objects or substrates. For the adhesive supply, different types of melters have been developed, including tank-style melters and grid and reservoir melters. In a tank-style melter, heating elements increase the temperature of one or more surfaces of the tank and the hot melt adhesive materials inside the tank. In a grid and reservoir melter, hot melt adhesive material moving through a tank or hopper heats on a grid of heating elements and melts as it passes from the grid into a reservoir, which is also heated. Manifolds are used to direct liquid hot melt adhesive material into plural flow streams for output through hoses to dispensers. Heaters are typically thermally connected to several components of a hot melt adhesive system, including the adhesive supply (such as a tank, grid, reservoir), manifold, hoses, and dispenser. The heaters maintain the hot melt adhesive material at proper adhesive viscosity and temperature.

In addition, different types of pumps have been developed for use in hot melt adhesive systems. Piston pumps, for example, use a piston to move a hydraulic plunger, which drives liquid hot melt adhesive material through the hot melt adhesive system. And gear pumps employ counter-rotating gears to create positive displacement for precise metering of liquid hot melt adhesive material. Pumps move the liquid hot melt adhesive material through the hot melt adhesive system, including through the hoses and to the dispenser for application to an object.

Metering systems have been developed to monitor or control the flow of hot melt adhesive material in hot melt adhesive dispensing systems. In a typical conventional metering system, for example, one or more material supply pumps are used to pump hot melt adhesive material and deliver it to a point of application. For example, one material supply pump, generally positioned at or near a supply of hot melt adhesive material (such as near a reservoir containing hot melt adhesive material) and referred to as a sump pump, provides pressurized hot melt adhesive material to a downstream metering station, which is sometimes referred to in the art as a remote metering station. In some cases, a manifold is included with a remote metering station to split a flow stream of hot melt adhesive material into plural flow streams for output through hoses to dispensers. Another material supply pump may be included with the remote metering station, or between the sump pump and the remote metering station, to assist in pumping the hot melt adhesive material. In such an arrangement having two pumps, the sump pump may be associated with a closed-loop feedback system, whereas the downstream material supply pump may be associated with an open-loop feedback system.

Generally, a closed-loop feedback system is a process control technique that uses feedback of a process output to adjust the variables impacting the output. An open-loop feedback system, in contrast, is a process control technique that does not use output feedback. For example, in the conventional metering system described above, the sump pump may be associated with a downstream flow sensor or meter to measure flow from the sump pump. The measured flow is considered by a controller associated with the sump pump, and the controller adjusts the sump pump in response to the measured flow. For example, the controller may increase or decrease the speed at which the sump pump operates in order to change the flow rate of hot melt adhesive material from the sump pump. The downstream material supply pump, may not necessarily be associated with a closed-loop feedback system, so the flow from it is not measured and the pump is not adjusted in response to a measured flow. By not measuring the output flow from the downstream material supply pump, information about the actual flow of hot melt adhesive material flowing therefrom toward the point of application is not collected.

Metering systems have also been developed that include downstream material supply pumps having closed-loop feedback systems. In such systems, an auxiliary controller and/or other auxiliary components are introduced to an adhesive dispensing system to provide the closed-loop feedback system for the downstream material supply pump. For example, an auxiliary sensor may be introduced with or downstream from the material supply pump for measuring the rate of hot melt adhesive material flow. This measurement is sent to the auxiliary controller. The auxiliary controller, in turn, communicates with other control components of the hot melt adhesive system that control the downstream material supply pump. These other control components, in turn, adjust the material supply pump in order that the measured flow more closely matches a target flow. When auxiliary controllers or components are added to a metering system, they have been housed in components separate from, and in addition to, the principal components of the hot melt adhesive dispensing system, including its metering system.

In other metering systems, only a single material supply pump is used, especially in circumstances where the supply of hot melt adhesive material is in close proximity to the point of application (less than 10 meters apart, for example).

There is a need, therefore, for a hot melt adhesive dispensing unit and metering systems for use therewith that address one or more of the shortcomings discussed above.

SUMMARY OF THE INVENTION

Embodiments of the present invention relate to hot melt adhesive dispensing units and metering systems used therewith. In particular, a metering system is disclosed that provides a closed-loop feedback system for a pump used to advance hot melt adhesive material from a source to a manifold that splits the adhesive into flow streams. Features relating to the closed-loop feedback system are incorporated into the principal components of the hot melt adhesive system, and no auxiliary components are required.

According to one embodiment of the invention, a hot melt adhesive dispensing unit includes an adhesive supply for receiving solid or semi-solid hot melt adhesive material, an adhesive supply heater associated with the adhesive supply for melting the solid or semi-solid hot melt adhesive material into a liquid hot melt adhesive material, and a manifold connected to the adhesive supply for receiving the liquid hot melt adhesive material and splitting the liquid hot melt adhesive material into flow streams. The hot melt adhesive dispensing unit further includes a flow rate sensor for measuring a flow rate of at least one of the liquid hot melt adhesive material flow streams, the flow rate sensor generating flow rate information, a pump connected to the manifold for pumping liquid hot melt adhesive material from the adhesive supply into the manifold, said pump including a pump motor, and a variable frequency drive connected to the flow rate sensor for receiving the flow rate information and to the pump motor for controlling the speed of the pump motor.

According to another embodiment of the invention, a metering system for a hot melt adhesive dispensing unit includes a manifold for splitting hot melt adhesive material into flow streams, a pump for pumping hot melt adhesive material from a tank of the hot melt adhesive dispensing unit to the manifold, a pump motor associated with the pump, a flow rate sensor for measuring the flow rate of hot melt adhesive material in the metering system, and a variable frequency drive in direct communication with the flow rate sensor and the pump motor for controlling the pump motor.

By implementing a closed-loop feedback system into the metering system, a separate auxiliary controller for collecting flow rate information and for communicating with other control components of a hot melt adhesive system is not used. Rather, the flow rate information gathered by the flow rate sensor is provided directly to the device that controls the pump motor, thereby providing a closed-loop feedback system. In addition to reducing the number of components in an adhesive dispensing system, the metering system reduces the cost of an adhesive dispensing system as compared with one that uses a separate auxiliary controller. Moreover, by eliminating a separate auxiliary controller, the number of devices used in the closed-loop feedback system is reduced, and the lag time between the when flow rate measurements are collected and when the pump or pump motor is adjusted is reduced, thereby improving the system response.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Referring to the figures, features of the present invention are shown in the context of a hot melt adhesive system 10. It will be appreciated that the hot melt adhesive system 10 shown and described herein is merely exemplary, and that the present invention is equally applicable to other hot melt adhesive systems. For example, the hot melt adhesive system 10 includes a tank-style melter as an adhesive supply, but the invention is also applicable to a hot melt adhesive system that includes a grid and reservoir melter.

Figure 1:
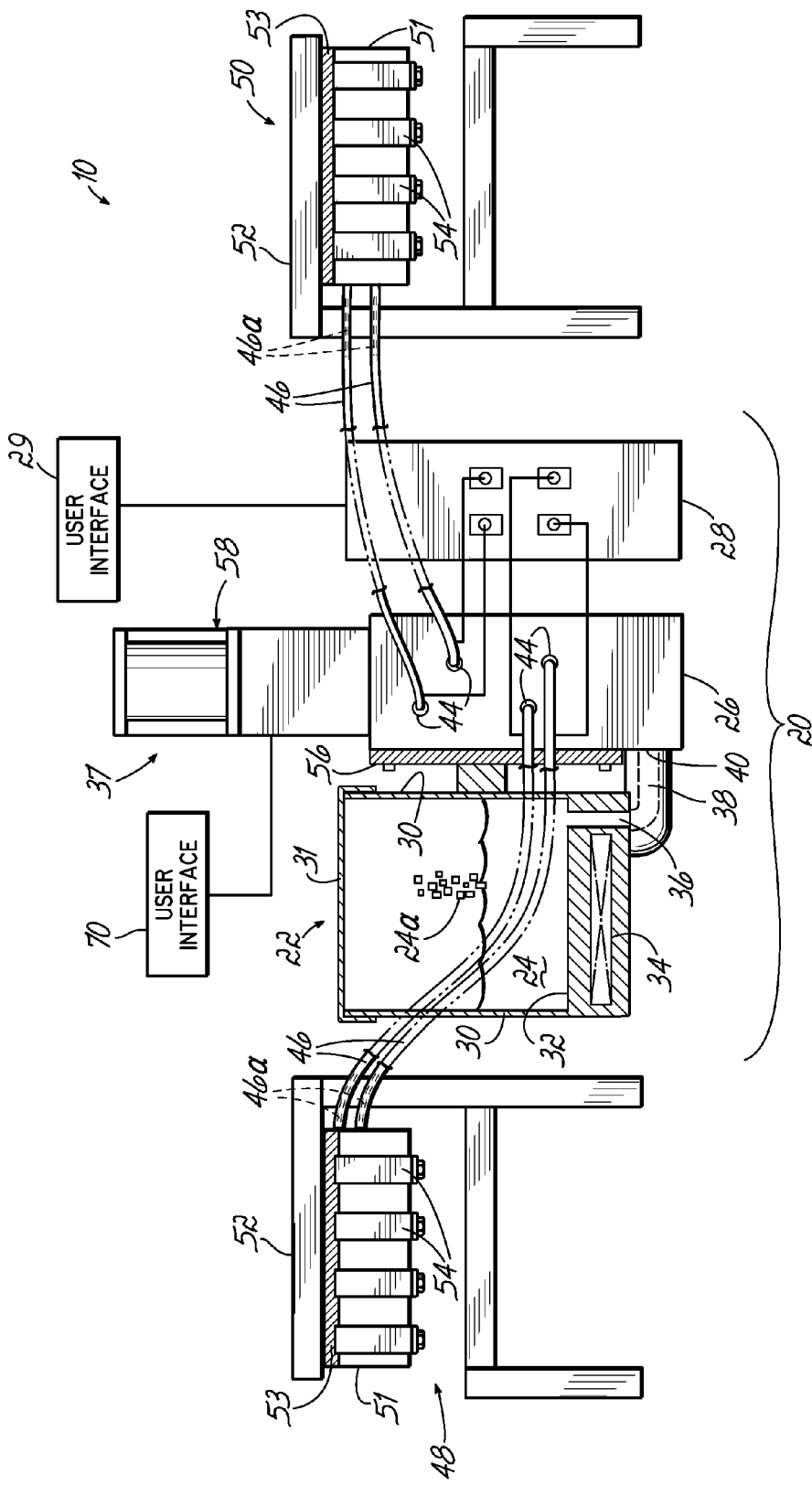
FIG. 1 is a diagrammatic view in partial cross-section of a hot melt adhesive system.

As best seen in FIG. 1, the hot melt adhesive system 10 includes a dispensing unit 20 that includes an adhesive supply 22 (a tank) for receiving and melting solid or semi-solid hot melt adhesive material 24a, a manifold 26 connected to the adhesive supply 22, a controller 28, and a user interface 29. Upon melting, the solid or semi-solid hot melt adhesive material 24a transforms into a liquid hot melt adhesive material 24. The adhesive supply 22 comprises side walls 30, a removable cover 31, and base 32 which includes one or more adhesive supply heaters 34 for melting and heating the hot melt adhesive material 24a and the liquid hot melt adhesive material 24 in the adhesive supply 22. The base 32 is integral with the adhesive supply 22 and contains one or more heaters 34. An outlet 36 proximate the base 32 is coupled to a passage 38 which connects to an inlet 40 of the manifold 26.

Figure 2:
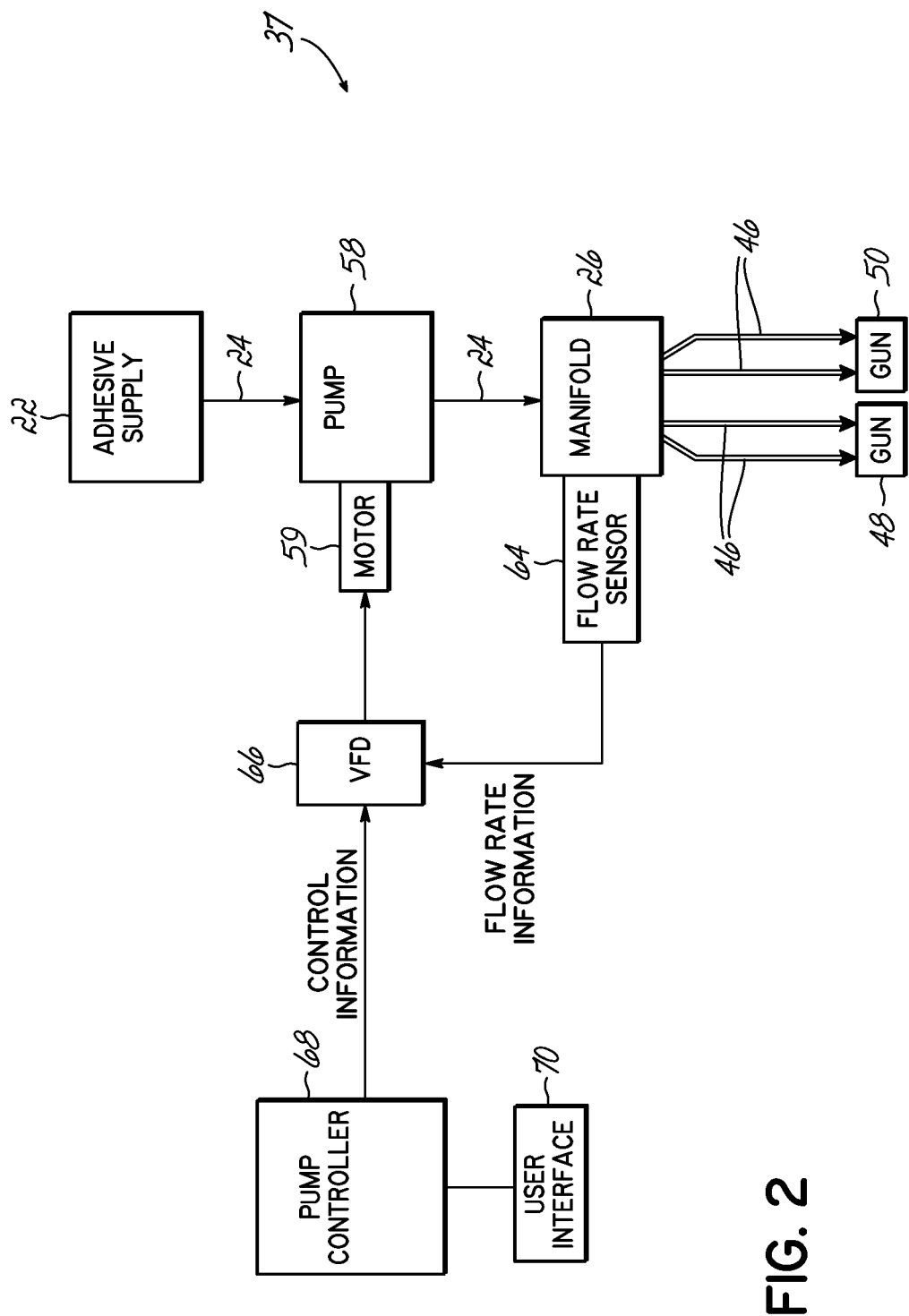
FIG. 2 is a schematic representation of features a metering system of the hot melt adhesive system of FIG. 1.
Figure 3:
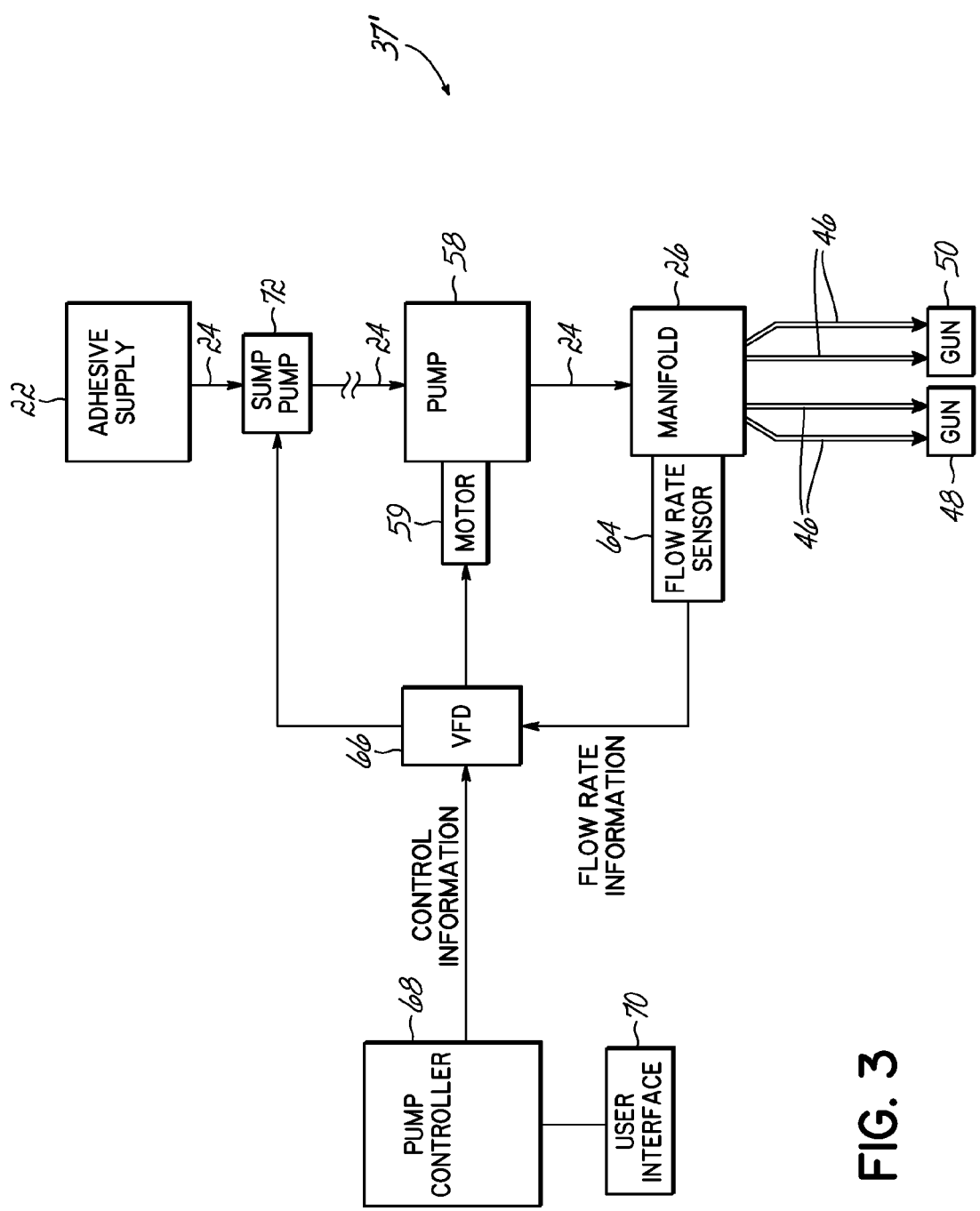
FIG. 3 is a schematic representation of features of another embodiment of a metering system for a hot melt adhesive system.

As shown, the manifold 26 is mounted to a side wall 30 of the adhesive supply 22. A pump 58, such as a vertically-oriented piston pump (as shown) or a gear pump, is coupled to the manifold 26 for pumping liquid hot melt adhesive material 24 from the adhesive supply 22 and into the manifold 26 where it is split into separate flows. The pump 58 is associated with a pump motor 59 (FIG. 2). The pump 58, its pump motor 59, and the manifold 26 are features of a metering system 37 for controlling the flow of liquid hot melt adhesive material 24 in the hot melt adhesive system 10, which will be discussed in greater detail below following the general description of the hot melt adhesive system 10. While FIG. 1 shows the adhesive supply 22 in close physical proximity to the manifold 26, it will be appreciated that other arrangements are also possible where the source of hot melt adhesive material is physically distant from the manifold, and in such arrangements more than one pump may be used to move hot melt adhesive material from the source toward the ultimate point of application. Features relating to the metering system 37 where the adhesive supply 22 is in close physical proximity to the manifold 26 are shown in FIG. 2, while features relating to another metering system 37' where the adhesive supply 22 is distant from the manifold 26 are shown in FIG. 3.

The manifold 26 includes a plurality of outlet ports 44 which are fitted with heated hoses 46 attached to one or more adhesive guns 48, 50 to supply the liquid hot melt adhesive material 24 to the guns 48, 50. Each heated hose 46 is associated with a hose heater 46a for maintaining an appropriate temperature in the hose 46. As schematically shown in FIGS. 2 and 3, the manifold 26 creates flow streams that are carried by the heated hoses 46 to the guns 48, 50. The guns 48, 50 include one or more adhesive dispensing modules 54 for dispensing/applying the liquid hot melt adhesive material 24 to an object (not shown). The adhesive dispensing modules 54 are mounted to gun bodies 51 having gun heaters 53 and are supported on a frame 52. The hot melt adhesive system 10 shown in FIG. 1 includes two guns 48, 50, one located on each side of the dispensing unit 20, although different numbers of guns, dispensing modules, and other configuration may also be used.

The manifold 26 includes a manifold heater 56 which is separate from the adhesive supply heater 34 and which can be independently controlled by the heater controller 28. It will be appreciated that a single heater could also be used for heating the adhesive supply 22 and the manifold 26.

With respect to the heating features of the hot melt adhesive system 10, the heater controller 28 is electrically coupled to the heaters, including the adhesive supply heater 34, the manifold heater 56, the hose heaters 46a, and the gun heaters 53. The heater controller 28 is also be coupled with various temperature sensors in the hot melt adhesive system 10, which may be associated with or included in the adhesive supply heater 34, the manifold heater 56, the hose heaters 46a, and the gun heaters 53. The heater controller 28 independently monitors and adjusts the adhesive supply heater 34, the manifold heater 56, the hose heaters 46a, and the gun heaters 53 to melt solid or semi-solid hot melt adhesive material 24a received in the adhesive supply 22 and to maintain the temperature of (melted) liquid hot melt adhesive material 24 to ensure proper viscosity of the liquid hot melt adhesive material 24 supplied to the guns 48, 50 and dispensed by the adhesive dispensing modules 54. Generally, the heater controller 28 receives temperature information from temperature sensors and sends heater control instructions, such as for controlling any or all of the heaters in the hot melt adhesive system 10, including the adhesive supply heater 34, the manifold heater 56, the hose heaters 46a, and the gun heaters 53. The heater control instructions adjusts, such as by increasing or decreasing, the temperature of the heaters, including the adhesive supply heater 34, the manifold heater 56, the hose heaters 46a, and the gun heaters 53.

The user interface 29 is associated with the heater controller 28 and provides a user with information about, and control over, heating functions of the hot melt adhesive system 10. For example, the user interface 29 presents information relating to adhesive temperature, heater temperature, and the like. The user interface 29 also includes controls for adjusting heating-related parameters of the hot melt adhesive system 10.

With reference also to FIG. 2, additional features relating to the metering system 37 and its control are disclosed. Again, the pump 58 advances liquid hot melt adhesive material 24 from the adhesive supply 22 to the manifold 26, where it is split into flow streams. The manifold 26 includes a flow rate sensor 64 for measuring the flow rate of the liquid hot melt adhesive material 24 there through. The flow rate sensor 64 creates flow rate information. For example, the flow rate sensor 64 may be an encoder that measures the rotation of a shaft in the manifold 26 that a flow of liquid hot melt adhesive material 24 causes to rotate. An exemplary manifold including a flow rate sensor suitable for the present invention is sold under the name TRUFLOW by the Nordson Corporation of Westlake, Ohio. Another exemplary manifold is disclosed in U.S. Pat. No. 6,857,441, the disclosure of which is incorporated by reference herein. Of course, other manifolds, flow rate sensors or flow rate measuring devices, may be used, and the specific form of the manifold 26 and the sensor 64 discussed herein provide an exemplary illustration only. In addition, a pressure sensor can also be used in place of or in conjunction with the flow rate sensor 64. The flow rate sensor 64 is part of a closed-loop feedback system associated with the pump 58, as will be discussed.

A variable frequency drive (VFD) 66 is included with the metering system 37 for controlling the pump motor 59 associated with the pump 58. In particular, a variable frequency drive, which is also sometimes referred to as an inverter, is a system for controlling the rotational speed of an electric motor by controlling the frequency or voltage of the electrical power supplied to the motor. The VFD 66 is in communication with and controls the motor 59, and the VFD includes the necessary hardware and software for accomplishing the features disclosed herein. In particular, the VFD 66 can control or adjust the motor speed of the motor 59, which motor speed influences the rate at which the pump 58 pumps or advances liquid hot melt adhesive material 24 through the hot melt adhesive system 10. Thus, by controlling the motor 59, the VFD 66 controls the flow rate of liquid hot melt adhesive material 24 pumped by the pump 58. The VFD 66 also communicates with the flow rate sensor 64, and in particular, the VFD receives the measured flow rate information from the flow rate sensor 64.

A pump controller 68 is provided with the metering system 37 and is designed to perform machine control and includes features for starting, stopping, and controlling aspects of pumping in the hot melt adhesive system. Particularly, the pump controller 68 communicates with or controls the VFD 66. The pump controller 68 provides the VFD 66 with various control information, such as setpoint information relating to a target adhesive flow rate for the metering system 37. For example, the flow rate of liquid hot melt adhesive material 24 through the hot melt adhesive system 10 may be known to be associated with particular pump motor speeds. During operation, the controller 68 sends control information to VFD 66 so it controls the pump motor 59 to operate at a pump motor speed associated with a target adhesive flow rate.

The pump controller 68 is also associated with a user interface 70 for providing a user with information about, and control over, pumping functions of the hot melt adhesive system 10. The user interface 70 presents information relating to adhesive flow rate, motor speed, and other pumping-related parameters of the hot melt adhesive system 10. The user interface 70 also provides controls for adjusting pumping-related parameters of the hot melt adhesive system 10. For example, a user may set a target adhesive flow rate or other control information using the user interface 70.

In addition to receiving the measured flow rate information from the flow rate sensor 64 and the control information from the pump controller 68, the VFD 66 is configured to compare the measured flow rate information with the control information. In response to this comparison, the VFD generates and implements motor control instructions or otherwise controls or adjusts the motor 59, such as by controlling the frequency or voltage of the electrical power supplied thereto. In turn, the pump 58 is controlled or adjusted so as to cause a flow rate of liquid hot melt adhesive material 24 (as measured by the flow rate sensor 64) that matches or closely matches (or, approximates) the target adhesive flow rate associated with the control instructions. By measuring the flow rate of liquid hot melt adhesive material 24 and by adjusting the pump 58 (including its motor 59) in view of the measured flow rate information, a closed-loop adhesive flow rate feedback system is provided.

By implementing a closed-loop feedback system into the metering system 37 as disclosed herein, a separate auxiliary controller for collecting flow rate information and for communicating with other control components of a hot melt adhesive system is not used. Rather, the flow rate information gathered by the flow rate sensor 64 is provided directly to the VFD 66, which controls the pump motor 59, thereby providing a closed-loop feedback system. In addition to reducing the number of components in an adhesive dispensing system, the disclosed metering system and arrangement reduces the cost of an adhesive dispensing system as compared with one that uses a separate auxiliary controller housed in components separate from the principal components of the hot melt adhesive system. Moreover, by eliminating a separate auxiliary controller, the number of devices used in the closed-loop feedback system is reduced, and therefore the lag time between the when flow rate measurements are collected and when the pump or pump motor is adjusted is reduced.

Turning next to FIG. 3, a metering system 37' is shown where the adhesive supply 22 is physically distant from the manifold 26. In such circumstances, more than one pump may be used to advance adhesive through a hot melt adhesive system. For example, a sump pump 72 advances liquid hot melt adhesive material 24 from the adhesive supply 22 toward the pump 58, which advances liquid hot melt adhesive material 24 to the manifold 26. A closed-loop feedback system is provided for the pump 58, as already discussed. The sump pump 72 may optionally be associated with an open-loop feedback system or a closed-loop feedback system. In some embodiments, a flow rate sensor may be included downstream from the sump pump 72 for measuring the flow rate of liquid hot melt adhesive material 24 therefrom. If desired, such a flow rate sensor may provide flow rate information to the VFD 66, and the VFD 66 may control a motor associated with the sump pump 72. In such an arrangement, the VFD 66 also receives control instructions relating to the sump pump 72, and controls the sump pump 72 so as to cause a flow rate of liquid hot melt adhesive material 24 that matches or closely matches the target adhesive flow rate associated with the control instructions, thereby providing a closed-loop feedback system for the sump pump 72. The VFD 66 may be modified to include the necessary hardware and software for controlling several pump motors consistent with what is disclosed above. Alternatively, a flow rate sensor downstream from the sump pump 72 may be associated with a controller other than the VFD 66.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A hot melt adhesive dispensing unit, comprising:
   an adhesive supply for receiving solid or semi-solid hot melt adhesive material,
   an adhesive supply heater associated with said adhesive supply for melting the solid or semi-solid hot melt adhesive material into a liquid hot melt adhesive material,
   a manifold connected to said adhesive supply for receiving the liquid hot melt adhesive material and splitting the liquid hot melt adhesive material into flow streams,
   a flow rate sensor for measuring a flow rate of at least one of the flow streams of the liquid hot melt adhesive, said flow rate sensor generating flow rate information,
   a pump connected to said manifold for pumping the liquid hot melt adhesive material from said adhesive supply into said manifold, said pump including a pump motor,
   a controller configured to provide control information to a variable frequency drive, and
   said variable frequency drive being in direct communication with said flow rate sensor and said controller, said variable frequency drive configured to receive said flow rate information,
   wherein said variable frequency drive is further configured to adjust a speed of said pump motor using said control information and said flow rate information.

2. The hot melt adhesive dispensing unit of claim 1, wherein the control information includes a target flow rate, and
   wherein said variable frequency drive is configured to adjust the speed of said pump motor so that said flow rate of the liquid hot melt adhesive material approximates said target flow rate.

3. The hot melt adhesive dispensing unit of claim 2, wherein said flow rate sensor includes an encoder.

4. The hot melt adhesive dispensing unit of claim 2, wherein said variable frequency drive controls said pump motor by controlling at least one of a frequency and voltage of electrical power supplied to said pump motor.

5. The hot melt adhesive dispensing unit of claim 2, further comprising a sump pump connected between said adhesive supply and said pump.

6. The hot melt adhesive dispensing unit of claim 3, wherein:
   said manifold includes a rotatable shaft,
   said flow rate sensor is coupled to said manifold, and
   said encoder is configured to measure rotation of said rotatable shaft.

7. The hot melt adhesive dispensing unit of claim 1, wherein said variable frequency drive compares the flow rate information with the control information and controls the speed of said pump motor in response to the comparison.

8. A metering system for a hot melt adhesive dispensing unit, comprising:
   a manifold for splitting liquid hot melt adhesive material into flow streams,
   a pump for pumping the liquid hot melt adhesive material from an adhesive supply of the hot melt adhesive dispensing unit to said manifold,
   a pump motor associated with said pump,
   a flow rate sensor for measuring the flow rate of the liquid hot melt adhesive material in the metering system, said flow rate sensor generating flow rate information,
   a controller configured to provide control information to a variable frequency drive, and
   said variable frequency drive in direct communication with said flow rate sensor and said controller, said variable frequency drive configured to receive said flow rate information,
   wherein said variable frequency drive is further configured to control a speed of said pump motor using said control information and said flow rate information.

9. The metering system of claim 8, wherein the control information includes a target flow rate, and
   wherein said variable frequency drive is configured to control said pump motor in order to adjust the flow rate of the liquid hot melt adhesive to approximate the target flow rate.

10. The metering system of claim 8, wherein said variable frequency drive compares the flow rate information with the control information and controls the speed of said pump motor in response to the comparison.

11. The metering system of claim 8, wherein:
    said manifold includes a rotatable shaft,
    said flow rate sensor is coupled to said manifold, and
    said flow rate sensor includes an encoder configured to measure the rotation of said rotatable shaft.

* * * * *